United States Patent
Calvarese

(10) Patent No.: US 8,995,228 B2
(45) Date of Patent: Mar. 31, 2015

(54) ULTRASONIC LOCATIONING USING ONLY TIME DIFFERENCE OF ARRIVAL MEASUREMENTS

(71) Applicant: Symbol Technologies, Inc., Schaumburg, IL (US)

(72) Inventor: Russell E. Calvarese, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 147 days.

(21) Appl. No.: 13/656,772

(22) Filed: Oct. 22, 2012

(65) Prior Publication Data

US 2014/0112104 A1    Apr. 24, 2014

(51) Int. Cl.
*G01S 3/80*      (2006.01)
*G01S 5/22*      (2006.01)

(52) U.S. Cl.
CPC .................................. *G01S 5/22* (2013.01)
USPC ....................................................... 367/127

(58) Field of Classification Search
CPC ............. G01S 5/22; G01S 5/28; G01S 13/86; G01S 7/52001
USPC ........................................................ 367/127
See application file for complete search history.

(56) References Cited

U.S. PATENT DOCUMENTS

| | | | |
|---|---|---|---|
| 4,305,141 A * | 12/1981 | Massa | ............................ 367/105 |
| 6,281,834 B1 | 8/2001 | Stilp | |
| 6,310,576 B1 | 10/2001 | Johnson | |
| 6,968,194 B2 | 11/2005 | Aljadeff et al. | |
| 7,339,522 B2 | 3/2008 | Dobson | |
| 7,499,711 B2 | 3/2009 | Hoctor et al. | |
| 7,561,105 B2 | 7/2009 | Murphy et al. | |

(Continued)

FOREIGN PATENT DOCUMENTS

| CN | 102033223 B | 10/2012 |
|---|---|---|
| WO | 0169281 A1 | 9/2001 |

OTHER PUBLICATIONS

Schau et al.; Passive source localization employing intersecting spherical surfaces from time-of-arrival differences; Aug. 1987; Acoustics, Speech, and. Signal Processing [see also IEEE Transactions on Signal Processing], IEEE Transactions vol. 35, Issue 8; pp. 1223-1225.*

(Continued)

*Primary Examiner* — Daniel Pihulic

(57) ABSTRACT

A method and system for ultrasonic locationing using time difference of arrival measurements includes an ultrasonic receiver including three microphones each disposed on a periphery of a housing and a fourth centrally-positioned microphone. A controller establishes only time difference of arrival measurements of an ultrasonic signal at each microphone, assumes an arbitrary flight time for the signal in order to obtain three flight distances of the signal at each of the three microphones, calculates an intersection point of three spheres having radii equal to the three flight distances, calculates a distance from the intersection point to the central microphone, subtracts the distance from a sum of the arbitrary flight time plus the time difference of arrival measurement for the central microphone to establish an test error, and searches different arbitrary flight times along a straight line through the central microphone and intersection point until the test error is less than a threshold, indicating an actual location of the emitter.

13 Claims, 3 Drawing Sheets

(56) References Cited

U.S. PATENT DOCUMENTS

| | | |
|---|---|---|
| 7,668,046 B2 | 2/2010 | Banker et al. |
| 7,945,626 B2 | 5/2011 | Sanderford, Jr. et al. |
| 8,081,923 B1 | 12/2011 | Larsen et al. |
| 2005/0117454 A1* | 6/2005 | Millikin .................. 367/127 |
| 2011/0084940 A1 | 4/2011 | Lee |
| 2011/0122730 A1 | 5/2011 | Damarla |
| 2014/0112104 A1* | 4/2014 | Calvarese .................. 367/127 |

OTHER PUBLICATIONS

International Search Report for counterpart International Patent Application No. PCT/US2013/064997 mailed Feb. 6, 2014.

* cited by examiner

ULTRASONIC LOCATIONING USING ONLY TIME DIFFERENCE OF ARRIVAL MEASUREMENTS

FIELD OF THE DISCLOSURE

The present disclosure relates generally to an ultrasonic locationing system, and more particularly to the ultrasonic locationing using only time difference of arrival (TDOA) measurements.

BACKGROUND

An ultrasonic receiver can be used to determine the location of items that contain ultrasonic emitters, such as a mobile device present within a retail, factory, or warehouse environment, for example. The ultrasonic emitter can transmit ultrasonic energy in a short burst which can be received by an ultrasonic transducer (microphone) in the ultrasonic receiver, thereby establishing the presence of the device within the environment.

Further, the use of several ultrasonic receivers distributed within the environment can also be used to provide a specific location of a particular device using techniques known in the art such as triangulation, trilateration, hyperbolic positioning (i.e. multilateration), and the like. Hyperbolic positioning should not be confused with trilateration, which uses distances or absolute measurements of time-of-flight of signals relating to three or more sites, or with triangulation, which uses the measurement of absolute angles. Both of these systems are also commonly used with radio navigation systems, where trilateration is the basis of the global positioning system (GPS). Presently, hyperbolic positioning is required when only time difference of arrival (TDOA) information for signals is available.

The hyperbolic positioning solution is different for different numbers of receiver microphones. Given one TDOA measurement from two microphones (or two receivers), it is a simple calculation to locate the emitter anywhere on one sheet of a two-sheeted hyperboloid. Given two TDOA measurements from three microphones (or three receivers), it is a simple substitution calculation to locate the emitter anywhere on the hyperbola that is the intersection of each of the single sheets of the two, two-sheeted hyperboloids. Given three TDOA measurement from four microphones (or four receivers), the solution leads to three non-linear equations with three unknown values (x,y,z). There are many approaches to solving non-linear equations each with tradeoffs on result certainty, accuracy, run time, and coding complexity. Given four TDOA measurement from five microphones (or five receivers), the solution leads to three homogeneous linear equations which are solvable with tradeoffs on result certainty, accuracy, run time and coding complexity. There are many robust linear algebra methods that can solve for the values of (x,y,z), such as Singular value decomposition or Gaussian Elimination. However, none of the above solutions are able to deliver a result having all of: high accuracy, high confidence, and fast answer determination.

Accordingly, there is a need for an improved technique to resolve the above issues with an ultrasonic locationing system using only TDOA information.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
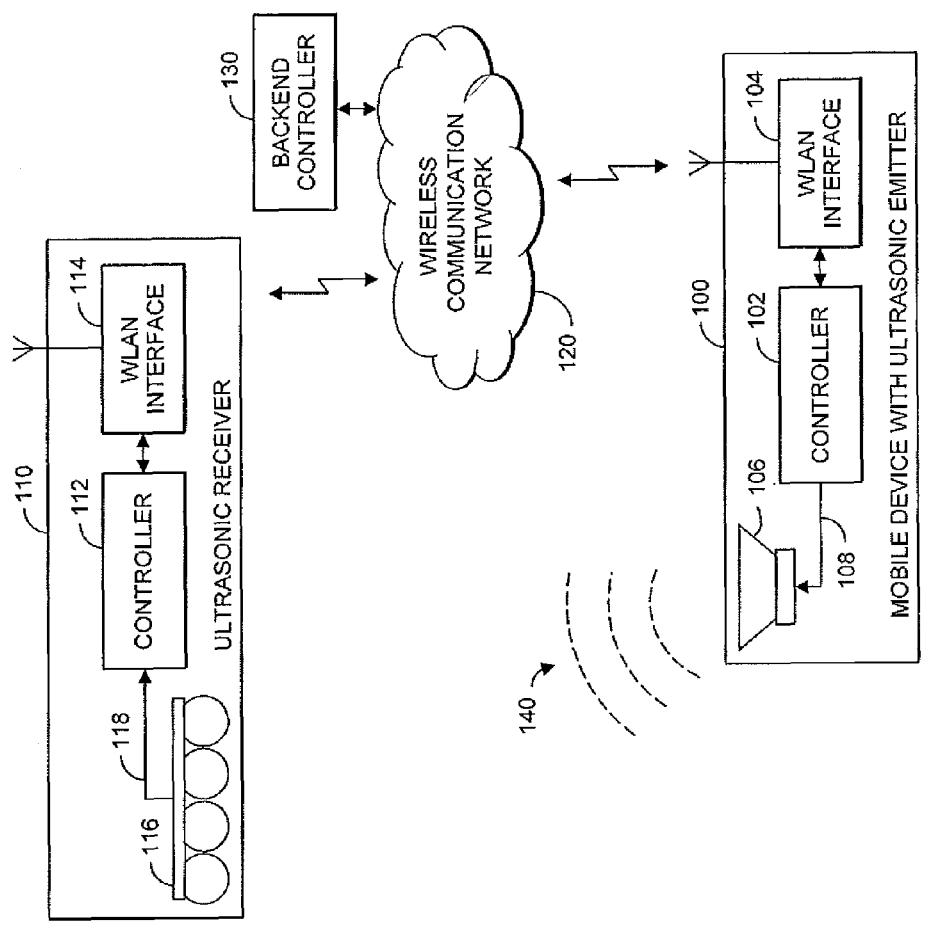
FIG. 1 is a block diagram of an ultrasonic locationing system, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, an improved technique is described to resolve the issues with ultrasonic locationing of a device with an ultrasonic emitter within an environment using only time difference of arrival (TDOA) information. In particular, the present invention assumes arbitrary flight times which are added to the TDOA information to provide a test location of an emitter, which is compared to actual measurements. A simple binary search can be performed to narrow the testing error to below an accuracy threshold to establish the actual location of the emitter, as will be described below. The present invention delivers a result having all of: high accuracy, high confidence, and fast answer determination. Although the description of the invention herein is applied to an ultrasonic system, it may be applied equally well to a radio frequency system with suitable replacement of emitters/microphones with RF transmitters/receivers.

The device to be locationed and incorporating the emitter can include a wide variety of business and consumer electronic platforms such as cellular radio telephones, mobile stations, mobile units, mobile nodes, user equipment, subscriber equipment, subscriber stations, mobile computers, access terminals, remote terminals, terminal equipment, cordless handsets, gaming devices, personal computers, and personal digital assistants, and the like, all referred to herein as a device. Each device comprises a processor that can be further coupled to a keypad, a speaker, a microphone, a display, signal processors, and other features, as are known in the art and therefore not shown.

Various entities are adapted to support the inventive concepts of the embodiments of the present invention. Those skilled in the art will recognize that the drawings herein do not depict all of the equipment necessary for system to operate but only those system components and logical entities particularly relevant to the description of embodiments herein. For example, routers, controllers, switches, access points/ports, and wireless clients can all includes separate communication interfaces, transceivers, memories, and the like, all under control of a processor. In general, components such as processors, transceivers, memories, and interfaces are well-known. For example, processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement one or more processors that perform the given logic. Therefore, the entities shown represent a system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components.

FIG. 1 is a block diagram of an ultrasonic locationing system, in accordance with the present invention. An ultrasonic transponder such as a piezoelectric speaker or emitter 106 can be implemented within a mobile device 100. The emitter can broadcast an ultrasonic signal such as short burst of ultrasonic sound (e.g. 140) that can be used to not only indicate the presence of the mobile device 100 within the environment, but also to locate the device in three dimensions within the environment. The mobile device can include a controller 102 to provide a specific signal 108 to be transmitted by the emitter 106. The controller 102 can also be coupled to a wireless local area network interface 104 for wireless communication with other devices in the communication network 120.

The wireless communication network 120 can include local and wide-area wireless networks, wired networks, or other IEEE 802.11 wireless communication systems, including virtual and extended virtual networks. However, it should be recognized that the present invention can also be applied to other wireless communication systems. For example, the description that follows can apply to one or more communication networks that are IEEE 802.xx-based, employing wireless technologies such as IEEE's 802.11, 802.16, or 802.20, modified to implement embodiments of the present invention. The protocols and messaging needed to establish such networks are known in the art and will not be presented here for the sake of brevity.

An ultrasonic receiver 110 includes a transducer such as an ultrasonic microphone array 116 that can respond to an ultrasonic sound pressure wave (e.g. 140) transmitted from an ultrasonic emitter 106 of a mobile device. The microphone array 116 provides electrical signals 118 to a receiver controller 112, such that the receiver controller will be aware of the presence of a device incorporating that ultrasonic emitter within the environment and can determine its location in accordance with the present invention. The receiver controller 112 can also be coupled to a wireless local area network interface 114 for wireless communication with other devices in the communication network 120. Alternatively, the controller 112 could be connected to the communication network 120 through a wired interface connection (not shown), such as an Ethernet interface connection.

In order to provide locationing ability, using a TDOA technique for example, the array of microphones 116 of the present invention is able to discriminate between different arrival times of a particular ultrasonic signal. In one embodiment, there are four microphones 116 integrated within a single receiver 110 housing. In this embodiment, three of the microphones can be disposed at each apex of a substantially triangular configuration, such as in a substantially flat triangular housing having dimensions of approximately twelve inches per side, and where the fourth microphone is disposed in a center of the triangular configuration, substantially coplanar with the other microphones (see FIG. 2). For unobtrusiveness and clear signaling, the housing can be affixed to a ceiling of the environment, where the position of each microphone is known and fixed. Of course, it should be recognized than many different housing and microphone configurations could be utilized with any number of microphones. However, the embodiment described herein utilizes relatively closely-spaced microphones within a singular housing, where the closeness of the microphones is accommodated by the present invention as described below.

As the location and position of these microphones 116 is known and fixed, a signal received by these microphones can used to find the location of an emitter (and the device/user carrying the emitter) using only TDOA measurements at each microphone in accordance with the present invention and as described herein. Further, once the location of the emitter is known, the present invention can used subsequent bursts from the emitter to track the movement of the emitter.

Figure 2:
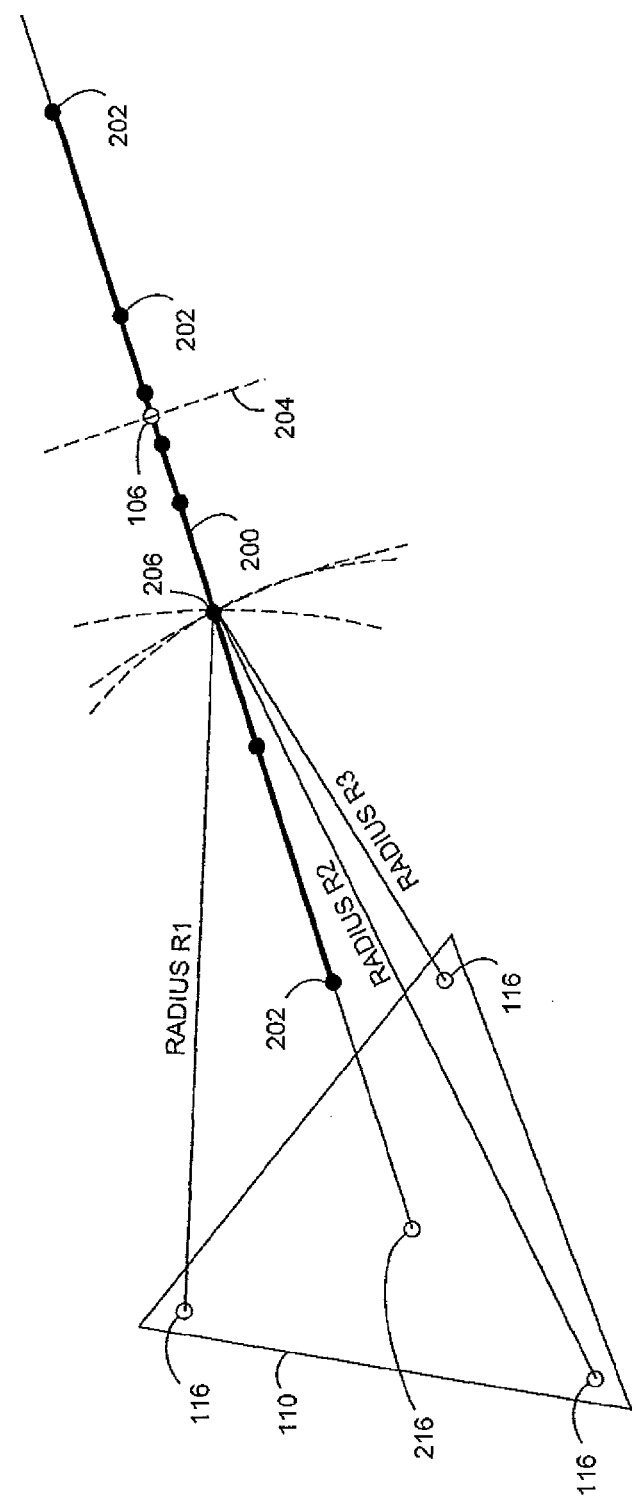
FIG. 2 is a graphical representation of a locationing algorithm, in accordance with some embodiments of the present invention.

Referring to FIG. 2, a receiver 110 is located within an environment. The receiver is operable to receive an ultrasonic burst signal from an emitter 106 also located within the environment. The ultrasonic signal impinges on the microphones 116 of the receiver at different times due to the relatively slow speed of sound. In other words, the ultrasonic signal has a different flight time to each of the emitters.

In operation, system of the present invention uses only time difference of arrival measurements. In particular, the ultrasonic receiver 110 including four microphones, three of the microphones 116 disposed on a periphery of the housing, e.g. with each microphone located at an apex of an equilateral triangular configuration, and a fourth centrally-positioned microphone 216 between the other three microphones, such as being equidistant from the other three microphones. The ultrasonic receiver 110 receives the ultrasonic signal from the ultrasonic emitter 106.

The controller of the receiver establishes only time difference of arrival (TDOA) measurements of the ultrasonic signal at each of the microphones. In particular, the controller only establishes the differences of arrival of the signal between any two microphones, i.e. the time difference is relative between microphones. For example, the controller can establish that a first microphone has a first TDOA relative to a third microphone and a second microphone has a second TDOA relative to the third microphone. In this example, the third microphone was chosen as the reference point (i.e. zero TDOA). The TDOA for the fourth microphone is also measured, but will only be used in a later step. The TDOA measurements do not include flight time information for the ultrasonic burst. In other words, the receiver does not know when the burst was transmitted. Therefore, the present invention introduces searching through different assumed different flight times and compares these against the TDOA information at the central microphone 216 to find the actual location of the emitter, as will be detailed below.

In particular, the controller first assumes an arbitrary flight time for the ultrasonic signal in order to obtain three respective flight distances of the ultrasonic signal for each of the three outer microphones. This arbitrary flight time is then added to the TDOA at each microphone to obtain a total flight time at each microphone. Therefore, the first microphone will have a total initial test flight time equal to the assumed arbitrary flight time plus the first TDOA, and the second microphone will have a total initial test flight time equal to the assumed arbitrary flight time plus the second TDOA. Inasmuch as the third microphone was chosen as the reference, it will have a total initial test flight time equal to only the assumed arbitrary flight time. It is preferred that a very short initial arbitrary flight time is chosen such that the subsequent test searches for the actual emitter will always be farther away from the initial arbitrary flight time. For example, an initial arbitrary flight time of one millisecond can be chosen. Multiplying by the speed of sound, this equates to a flight distance of approximately one foot. Since the receiver is mounted to a ceiling, it is expected that all emitters within the environment will be located near a floor, at least four feet away from the receiver. Accordingly, the flight distance to the first microphone is initially estimated to be one foot plus the difference due to the first TDOA, the flight distance to the second microphone is initially estimated to be one foot plus the difference due to the second TDOA, and the flight distance to the third microphone is initially estimated to be one foot.

Using the three flight times, the controller can then calculate an intersection point 206 of three spheres centered on each of the three microphones 116 and defined by three radii equal to the three flight distances, Radius R1, Radius R2, Radius R3 as shown. The controller can then calculate a geometric distance along a line 200 from the intersection point 206 to the central microphone 216. The straight line and the geometric distance are defined by the location of the calculated intersection point and the known physical location of the central microphone 216. The controller than adds the arbitrary flight time used for the other three microphones to the TDOA measurement for the central microphone and finds a test distance considering the propagation speed of the ultrasound. The controller then subtracts the geometric distance from the test distance to establish a test error. The test error is compared to a desired location accuracy threshold (e.g. 0.1 feet) and if it is within this threshold then the actual location of the emitter is known to within that threshold.

Inasmuch as the initially chosen arbitrary flight time was only one foot, it can be reasonable assumed that the first test error will be considerable. Therefore, the controller will increase subsequent arbitrary flight times and repeat the above steps, searching the different arbitrary flight times 202 along the straight line through the central microphone and intersection point until the test error is less than an accuracy threshold, and thereby finding an actual location 204 of the emitter.

In practice, the searching along the straight line is conducted within a range of distances between a minimum (e.g. zero) and a maximum ultrasonic flight distance within the environment (i.e. the ultrasonic flight time from the receiver to the furthest extent of the environment, which could be over one-thousand feet). A maximum flight time can be established for an environment, i.e. at a farthest distance apart for the receiver and an emitter where the receiver is still able to detect the emitter reliably. Therefore, a reasonable maximum flight time can be estimated or empirically determined in the actual environment.

Different linear search algorithms could be used. For example, the search algorithm could simply search from the minimum to the maximum flight distance, testing using a uniform step size having a desired locationing accuracy. In this example, searching is conducted using a uniform step size that starts at the minimum ultrasonic flight distance and increases the arbitrary flight time for each search loop until the test error changes sign after one point 204, indicating that the search has just passed the actual location of the emitter. Inasmuch as the searching is conducted over a straight line there are no peaks/valleys (i.e. no local maximums/minimums) in the search results, and therefore the first change in test error sign, from positive to negative or vice versa, indicates the actual location of the emitter, to within the step size that has the desired locationing accuracy.

Alternatively, the search algorithm could be a binary search where the step size could decrease with the number of iterations of each search loop. In a binary search, the minimum flight distance could be the first test point giving a test error with a particular sign. The next test point could be the maximum flight distance giving a test error with an opposite sign. The step size is then reduced in half to test the next test point. Depending on the sign, establishing whether the test point of too low or too high, the step size will be reduced in half again and the step will be in the direction opposite of the previous test point, and the searching will continue, going above and below the actual location, cutting each step in half until the test error is less than a desired accuracy threshold, establishing the actual location of the emitter. Optionally, the step size of the can be chosen in relation to the magnitude of the test error, where a large error indicates the need for a larger next step. This type of binary search is faster than the uniform step search described previously. However, it should be recognized that many different type of linear searching algorithms could be used.

Although, the embodiment herein describes the case utilizing one emitter and four microphones. The present invention, with suitable modification, is also applicable for the case there are four emitters at fixed locations and one microphone in the mobile device.

Figure 3:
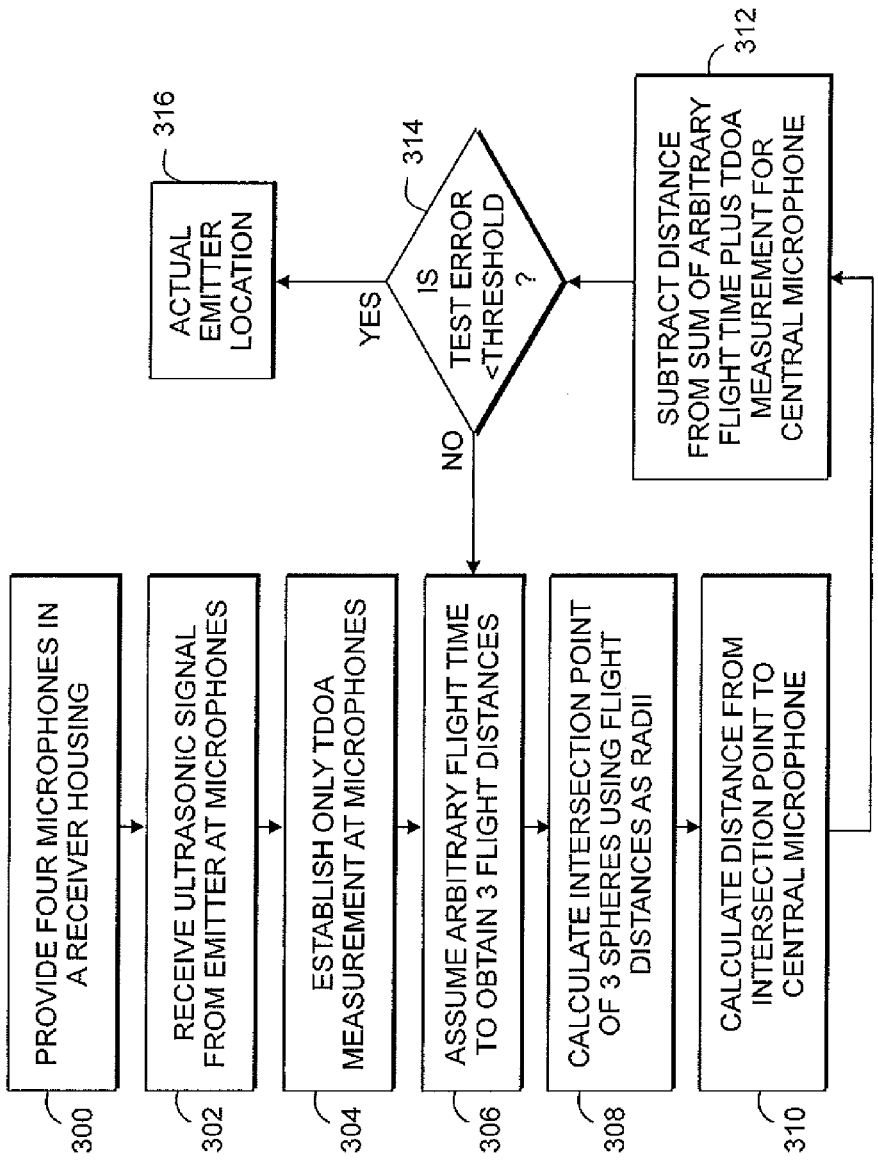
FIG. 3 is a diagram illustrating a method for ultrasonic locationing, in accordance with some embodiments of the present invention.

FIG. 3 is a diagram illustrating a method for ultrasonic locationing using only time difference of arrival measurements, according to some embodiments of the present invention.

A first step 300 includes providing an ultrasonic receiver including four microphones, three of the microphones disposed in a housing with each microphone disposed on a periphery of the housing, such as at an apex of a triangular configuration, and a fourth centrally-positioned microphone positioned between the other three microphones, such as being equidistant from the other three microphones.

A next step 302 includes receiving an ultrasonic signal or burst from an ultrasonic emitter within an environment.

A next step 304 includes establishing only time difference of arrival measurements of the ultrasonic signal at each of the four microphones.

A next step 306 includes assuming an arbitrary flight time for the ultrasonic signal in order to obtain three respective flight distances of the ultrasonic signal for each of the three microphones.

A next step 308 includes calculating an intersection point of three spheres defined by three radii equal to the three flight distances.

A next step 310 includes calculating a distance from the intersection point to the central microphone.

A next step 312 includes subtracting the distance from a sum of the arbitrary flight time plus the time difference of arrival measurement for the central microphone to establish a test error.

A next step 314 includes repeating steps 306 through 312, searching different arbitrary flight times along a straight line through the central microphone and intersection point until the test error is less than an accuracy threshold, indicating an actual location of the emitter 316. The searching is conducted within a range of distances between a minimum (e.g. zero) and a maximum ultrasonic flight distance within the environment (i.e. the ultrasonic flight time from the receiver to the furthest extent of the environment, which could be over one-thousand feet).

Different linear search algorithms could be used. For example, the search algorithm could simply search from the minimum to the maximum flight distance, testing using a step size having a desired locationing accuracy. In this example, searching is conducted using a uniform step size that starts at the minimum ultrasonic flight distance and increases the arbitrary flight time for each search loop of steps 306 through 314 until the test error changes sign, indicating the actual location of the emitter. Inasmuch as the searching is conducted over a straight line there are no peaks/valleys (i.e. no local maximums/minimums) in the search results, and therefore the first change in test error sign, from positive to negative or vice versa, indicates the actual location of the emitter, to within the step size that has the desired locationing accuracy.

Alternatively, the search algorithm could be a binary search where the step size could decrease with the number of iterations of each search loop of steps 306 through 312. In a binary search, the minimum flight distance could be the first test point giving a test error with a particular sign. The next test point could be the maximum flight distance giving a test error with an opposite sign. The step size is then reduced in half to test the next test point. Depending on the sign, establishing whether the test point of too low or too high, the step size will be reduced in half again and the step will be in the direction opposite of the previous test point, and the searching will continue, going above and below the actual location, cutting each step in half until the test error is less than a desired accuracy threshold, establishing the actual location of the emitter. Optionally, the step size of the can be chosen in relation to the magnitude of the test error, where a large error indicates the need for a larger next step. This type of binary search is faster than the uniform step search described above. It should be recognized that many different type of linear searching algorithms could be used.

Advantageously, the present invention provides an ultrasonic locationing technique that can deliver a location result having all of: high accuracy, high confidence, and fast answer determination. In particular, for a uniform step size of 0.1" the emitter location can be found in tens of milliseconds on a modern day CPU. The binary search would run in the sub-millisecond range. The algorithm does not add any error other than the step size which is only a tradeoff of run time which is negligible. There is a high confidence in the result since there are no local minimum/maximum that exist on previous search algorithms using the intersection of the hyperboloids approach. There are no input values that cause the algorithm to fail due to settling on a local minimum or maximum. The present invention runs in "n" time or O(n) where n is the step size and is the related to number of iterations of the search loop. O(n) algorithms do not take excessive time to run as the step size is decreased, and the runtime scales. Because the algorithm searches on a straight line and the test criteria is strictly increasing/decreasing as we move along the line, it can easily be modified to run in log(n) time, i.e. binary search which is the fastest type of search algorithm where each iteration of the search loop doubles the accuracy such that, after a negligible number of loops, the error added by the algorithm is below the system noise.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD- ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for ultrasonic locationing using only time difference of arrival measurements, the system comprising:
   an ultrasonic receiver including four microphones, three of the microphones disposed on a periphery of a housing, and a fourth centrally-positioned microphone between the other three microphones, the ultrasonic receiver operable to receive an ultrasonic signal from an ultrasonic emitter within an environment; and
   a controller communicatively coupled to the receiver and operable to:
      a) establish only time difference of arrival measurements of the ultrasonic signal at each of the four microphones,
      b) assume an arbitrary flight time for the ultrasonic signal in order to obtain three respective flight distances of the ultrasonic signal for each of the three microphones,
      c) calculate an intersection point of three spheres defined by three radii equal to the three flight distances,
      d) calculate a distance from the intersection point to the centrally-positioned microphone,
      e) subtract the distance from a test distance corresponding to a sum of the arbitrary flight time plus the time difference of arrival measurement for the centrally-positioned microphone to establish an test error, and
      f) repeat steps b) through e), searching different arbitrary flight times along a straight line through the centrally-positioned microphone and intersection point until the test error is less than an accuracy threshold, indicating an actual location of the emitter.

2. The system of claim 1, wherein searching is conducted within a range of distances between a minimum and a maximum ultrasonic flight distance within the environment.

3. The system of claim 1, wherein searching is conducted using a binary search algorithm.

4. The system of claim 3, wherein searching is conducted using a step size that decreases with the number of iterations of each search loop of steps b) through f).

5. The system of claim 2, wherein searching is conducted using a uniform step size that starts at the minimum ultrasonic flight distance and increases the arbitrary flight time for each search loop of steps b) through f) until the test error changes sign, indicating the actual location of the emitter.

6. The system of claim 1, wherein the flight distance for each microphone is calculated by multiplying the speed of sound by the sum of the arbitrary flight time plus the time difference of arrival measurement for each microphone.

7. The system of claim 1, wherein the housing has a maximum dimension of not more than twelve inches, and wherein the three microphones are disposed with each microphone located at an apex of a triangular configuration, and the fourth centrally-positioned microphone located equidistant from the other three microphones.

8. A method for ultrasonic locationing using only time difference of arrival measurements, the method comprising the steps of:
   providing an ultrasonic receiver including four microphones, three of the microphones disposed on a periphery of a housing, and a fourth centrally-positioned microphone between the other three microphones;
   receiving an ultrasonic signal from an ultrasonic emitter within an environment;
   a) establishing only time difference of arrival measurements of the ultrasonic signal at each of the four microphones;
   b) assuming an arbitrary flight time for the ultrasonic signal in order to obtain three respective flight distances of the ultrasonic signal for each of the three microphones;
   c) calculating an intersection point of three spheres defined by three radii equal to the three flight distances;
   d) calculating a distance from the intersection point to the centrally-positioned microphone;
   e) subtracting the distance from a test distance corresponding to a sum of the arbitrary flight time plus the time difference of arrival measurement for the centrally-positioned microphone to establish an test error; and
   f) repeating steps b) through e), searching different arbitrary flight times along a straight line through the centrally-positioned microphone and intersection point until the test error is less than an accuracy threshold, indicating an actual location of the emitter.

9. The method of claim 8, wherein searching is conducted within a range of distances between a minimum and a maximum ultrasonic flight distance within the environment.

10. The method of claim 8, wherein searching is conducted using a binary search algorithm.

11. The method of claim 10, wherein searching is conducted using a step size that decreases with the number of iterations of each search loop of steps b) through f).

12. The method of claim 9, wherein searching is conducted using a uniform step size that starts at the minimum ultrasonic flight distance and increases the arbitrary flight time for each search loop of steps b) through f) until the test error changes sign, indicating the actual location of the emitter.

13. The method of claim 8, wherein the flight distance for each microphone is calculated by multiplying the speed of sound by the sum of the arbitrary flight time plus the time difference of arrival measurement for each microphone.

* * * * *